US010521060B2

United States Patent
Tsai et al.

(10) Patent No.: US 10,521,060 B2
(45) Date of Patent: Dec. 31, 2019

(54) WEARABLE ELECTRONIC DEVICE AND A REFLECTED-CAPACITIVE TOUCH PANEL THEREOF

(71) Applicant: HIMAX TECHNOLOGIES LIMITED, Tainan (TW)

(72) Inventors: Cheng-Hung Tsai, Tainan (TW); Yao-Mao Liu, Tainan (TW); Wen-Juan Li, Tainan (TW); Jyun-Yan Liu, Tainan (TW); Li-Lin Liu, Tainan (TW); Jui-Ni Li, Tainan (TW); Wai-Pan Wu, Tainan (TW); Shen-Feng Tai, Tainan (TW)

(73) Assignee: Himax Technologies Limited, Tainan (TW)

( * ) Notice: Subject to any disclaimer, the term of this patent is extended or adjusted under 35 U.S.C. 154(b) by 160 days.

(21) Appl. No.: 15/857,646

(22) Filed: Dec. 29, 2017

(65) Prior Publication Data
US 2019/0073053 A1    Mar. 7, 2019

Related U.S. Application Data

(60) Provisional application No. 62/554,472, filed on Sep. 5, 2017.

(51) Int. Cl.
    *G06F 3/044* (2006.01)
    *G04G 21/08* (2010.01)
    *G06F 3/041* (2006.01)

(52) U.S. Cl.
    CPC ............ *G06F 3/044* (2013.01); *G04G 21/08* (2013.01); *G06F 3/0416* (2013.01)

(58) Field of Classification Search
    CPC combination set(s) only.
    See application file for complete search history.

(56) References Cited

U.S. PATENT DOCUMENTS

| 2016/0085334 | A1* | 3/2016 | Hashimoto | G06F 3/044 345/174 |
| 2016/0202826 | A1* | 7/2016 | Han | G06F 1/16 345/174 |
| 2017/0160819 | A1* | 6/2017 | Yi | G06F 3/0416 |
| 2017/0192552 | A1* | 7/2017 | Graf | G06F 3/044 |

FOREIGN PATENT DOCUMENTS

| CN | 204808290 U | 11/2015 |
| TW | 201612719 A | 4/2016 |

OTHER PUBLICATIONS

Office Action dated Jun. 25, 2018 in corresponding Taiwan Patent Application No. 106142160.

* cited by examiner

*Primary Examiner* — Temesghen Ghebretinsae
*Assistant Examiner* — Sosina Abebe
(74) *Attorney, Agent, or Firm* — Donald E. Stout; Stout, Uxa & Buyan, LLP

(57) ABSTRACT

A reflected-capacitive touch panel of a wearable electronic device includes a center touch sensing portion composed of a plurality of mutual-capacitance sensors; a border touch sensing portion composed of a plurality of hybrid self-capacitance and mutual-capacitance sensors; and a predetermined bonding area into which channels of the center touch sensing portion and the border touch sensing portion are routed.

16 Claims, 7 Drawing Sheets

# WEARABLE ELECTRONIC DEVICE AND A REFLECTED-CAPACITIVE TOUCH PANEL THEREOF

CROSS-REFERENCE TO RELATED APPLICATIONS

This application claims the benefit of U.S. Provisional Application No. 62/554,472, filed on Sep. 5, 2017, the entire contents of which are herein expressly incorporated by reference.

BACKGROUND OF THE INVENTION

1. Field of the Invention

The present invention generally relates to a wearable electronic device, and more particularly to a reflected-capacitive touch panel of a wearable electronic device with reduced bonding area or fewer touch sensing channels.

2. Description of Related Art

A smartwatch is a computerized wristwatch that is capable of doing more than measuring, keeping and indicating time. In addition to basic tasks such as calculations and game playing, modern smartwatch can run mobile apps, access the Internet, and even place and receive voice/video calls.

A wearable electronic device such as the smartwatch is generally limited in surface area where a touch screen is mounted. A wearable electronic device may have some buttons disposed on a side surface thereof for providing features or functions a user may frequently use. However, those physical buttons defeat a trend towards a fashionable wearable electronic device such as the smartwatch. A need has thus arisen to propose a novel scheme adaptable to a wearable electronic device in order to support more features of functions.

SUMMARY OF THE INVENTION

In view of the foregoing, it is an object of the embodiment of the present invention to provide a reflected-capacitive touch panel of a wearable electronic device with reduced bonding area or fewer touch sensing channels without sacrificing features or functions at a border of the touch panel of the wearable electronic device.

According to one embodiment, a reflected-capacitive touch panel of a wearable electronic device includes a center touch sensing portion, a border touch sensing portion and a predetermined bonding area. The center touch sensing portion is composed of a plurality of mutual-capacitance sensors. The border touch sensing portion surrounds the center touch sensing portion, and is composed of a plurality of hybrid self-capacitance and mutual-capacitance sensors. Channels of the center touch sensing portion and the border touch sensing portion are routed into the predetermined bonding area.

DETAILED DESCRIPTION OF THE INVENTION

Figure 1:
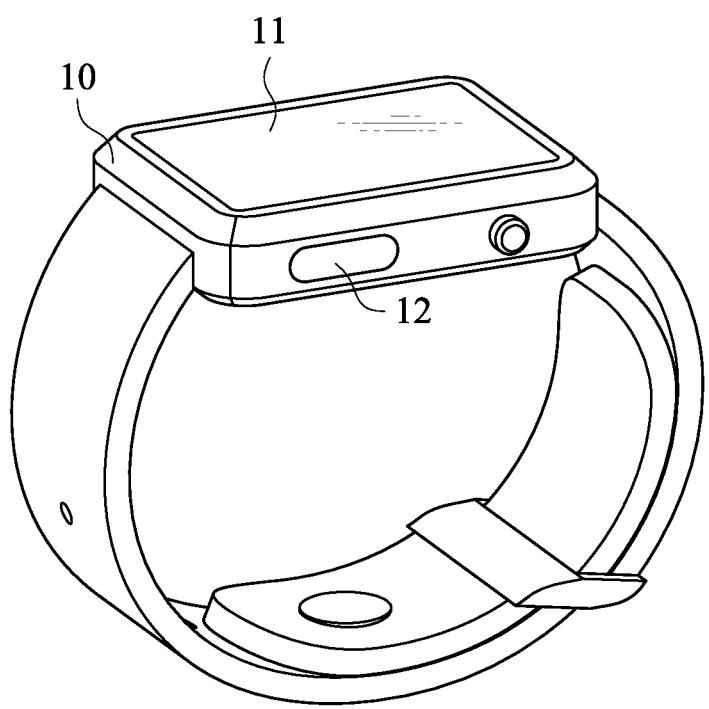
FIG. 1 shows a perspective view illustrated of a wearable electronic device.

FIG. 1 shows a perspective view illustrated of a wearable electronic device 100 such as a smartwatch. The wearable electronic device 100 may generally include a flat-panel display or a touch screen 11 disposed on a front surface of a housing 10. The wearable electronic device 100 may also include some physical buttons 12 disposed on a side surface of the housing 10 for providing features or functions a user may frequently use. As stated above, the physical buttons 12 defeat a trend towards a fashionable wearable electronic device such as the smartwatch. Regarding this unfavorableness, some features or functions may be devised on a border of the touch screen 11 rather than the housing 10 to replace some or all of the physical buttons 12. Moreover, the features or functions disposed on the border of the touch screen 11 commonly occupy less area than the physical buttons 12, such that adding more features or functions to the wearable electronic device becomes more realizable and affordable by way of devising features or functions on the border of the touch screen 11.

Figure 2A:
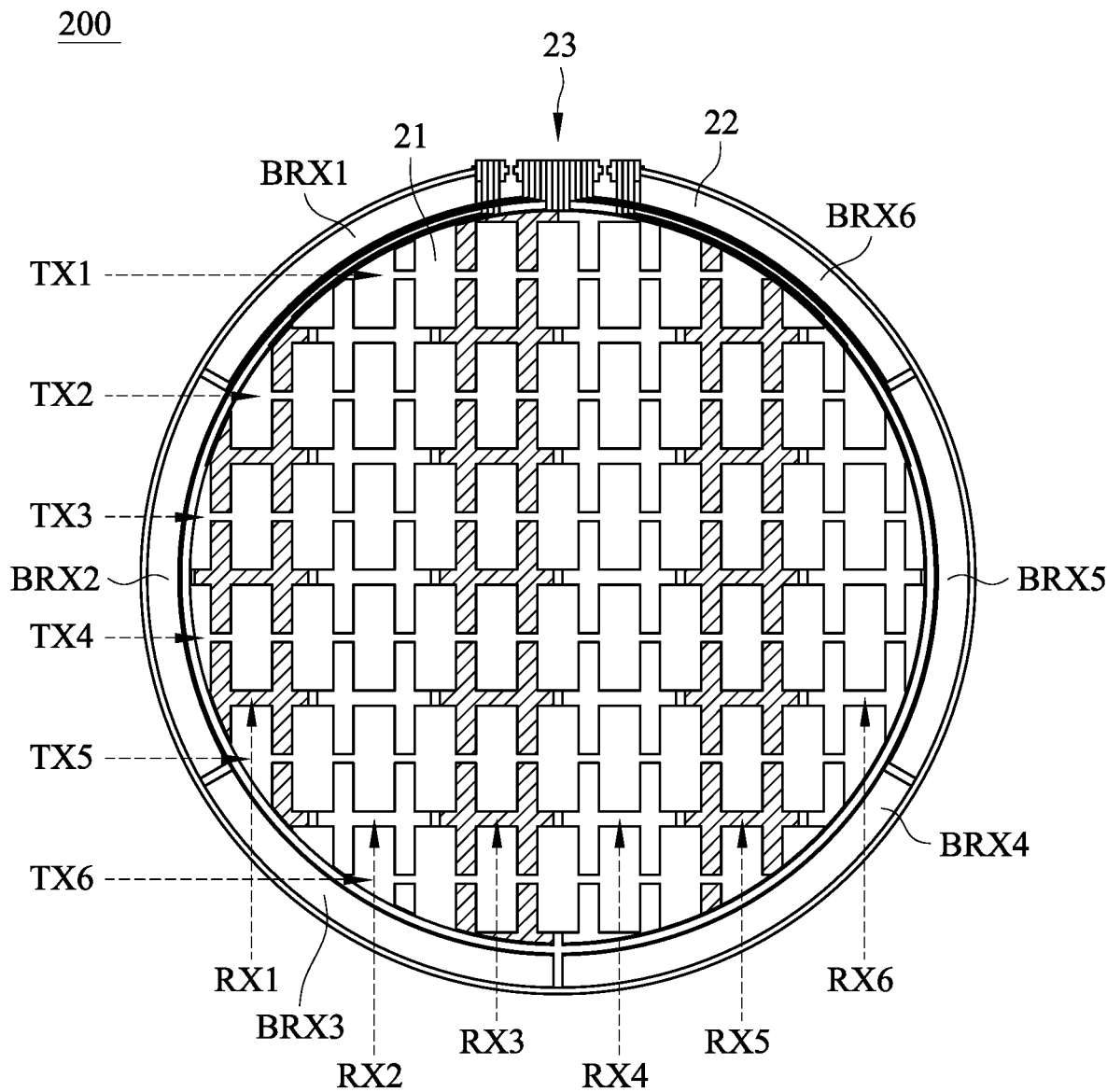
FIG. 2A shows a top view illustrated of a reflected-capacitive touch panel of a wearable electronic device.
Figure 2B:
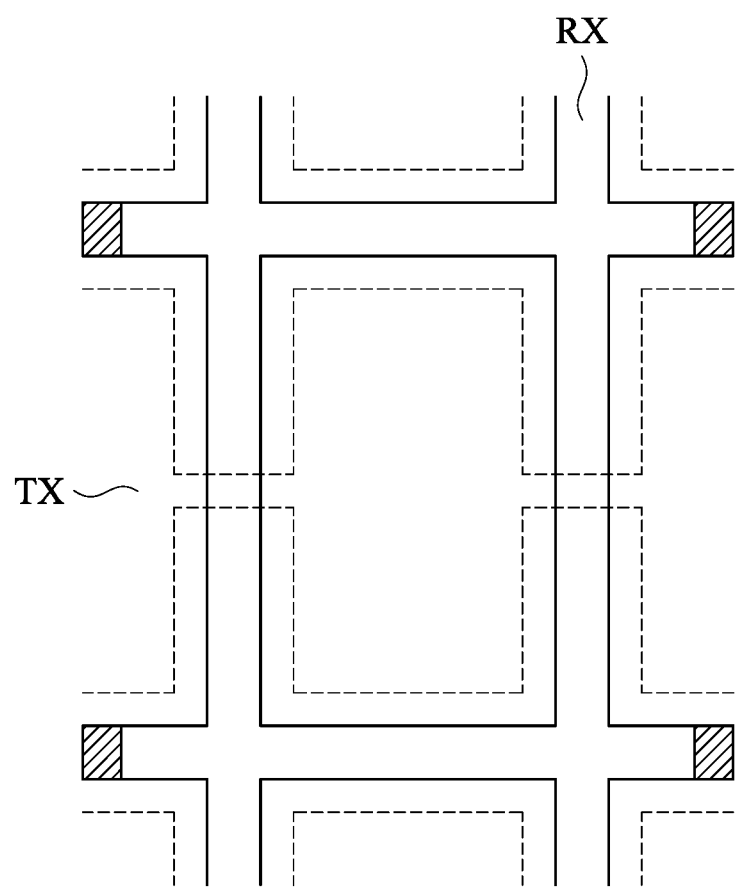
FIG. 2B shows a partial enlarged top view of the center TX channels and the center RX channels of FIG. 2A.

FIG. 2A shows a top view illustrated of a reflected-capacitive touch panel 200 of a wearable electronic device such as the smartwatch 100 exemplified in FIG. 1. A round shape of the reflected-capacitive touch panel ("touch panel" hereinafter) 200 is exemplified here. The touch panel 200 may include a center touch sensing portion, and a border touch sensing portion surrounding the center touch sensing portion. Specifically, the center touch sensing portion is constructed from mutual-capacitance sensors 21 that are arranged in a specific form such as a matrix form. The mutual-capacitance sensors 21 may be operated by sending driving signals via center transmitting (TX) channels (e.g., TX1 to TX6, totaling six center transmitting channels) and receiving sensing signals via center receiving (RX) channels (e.g., RX1 to RX6, totaling six center receiving channels). Generally speaking, the center TX channels are arranged in a first direction, and the center RX channels are arranged in a second direction that is, for example, substantially perpendicular to the first direction. For example, the center TX channels are arranged in rows and the center RX channels are arranged in columns. FIG. 2B shows a partial enlarged top view of the center TX channels and the center RX channels of FIG. 2A.

The border touch sensing portion is constructed from self-capacitance sensors 22 (six self-capacitance sensors 22 are shown) that are arranged surrounding the center touch sensing portion. The self-capacitance sensors 22 may be operated by receiving sensing signals via border receiving (BRX) channels (e.g., BRX1 to BRX6, totaling six border receiving channels). It is noted that the border receiving (BRX) channels (of the border touch sensing portion) are independent from the center receiving (RX) channels (of the center touch sensing portion). The touch panel 200 may also include ground (GND) channels (e.g., TXGND for center transmitting channels and RXGND for center/border receiving channels, totaling six ground channels).

Figure 2C:
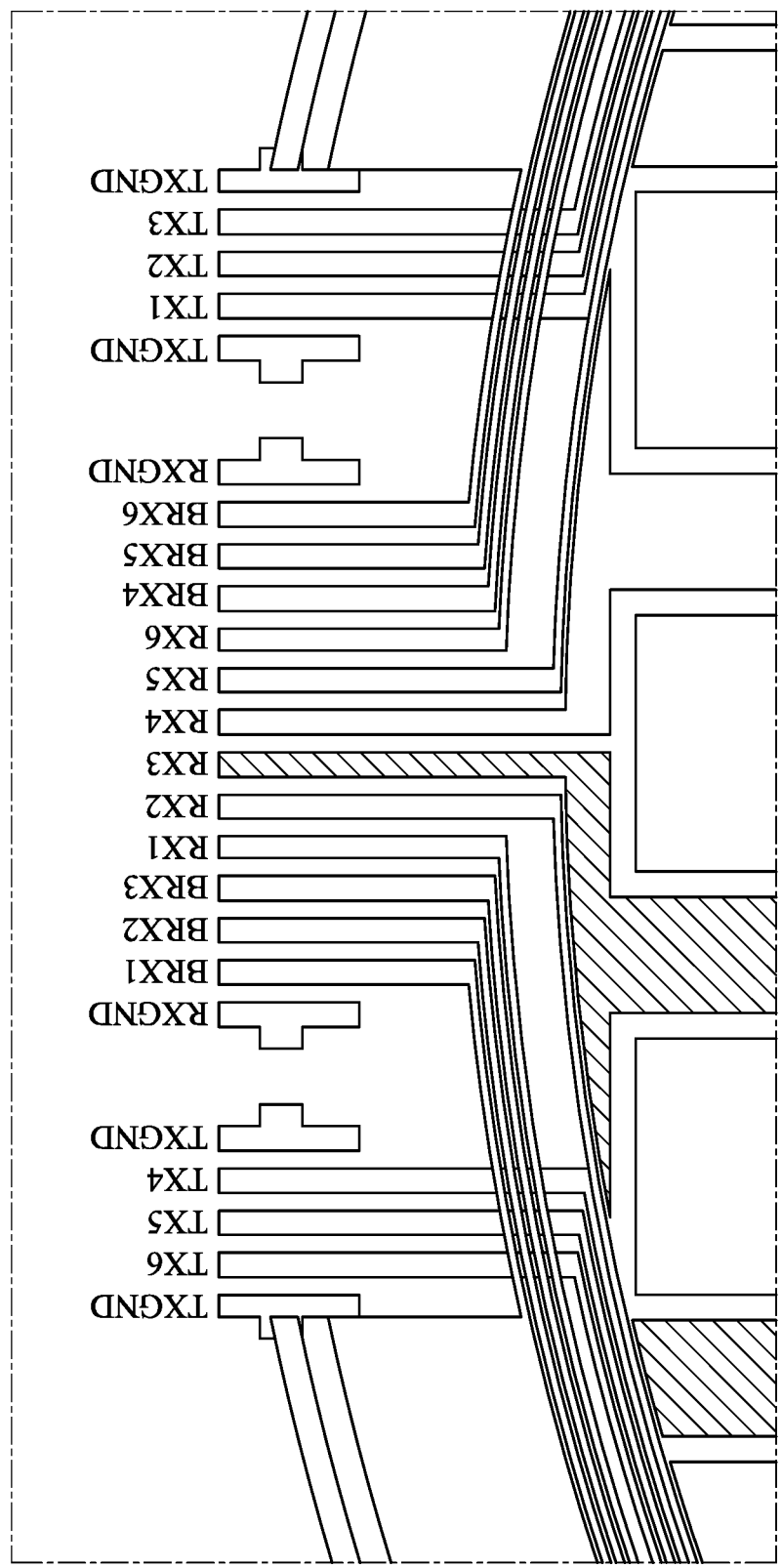
FIG. 2C shows an enlarged partial diagram of FIG. 2A illustrating the predetermined bonding area.

The center transmitting (TX) channels, the center receiving (RX) channels, the border receiving (BRX) channels and the ground (GND) channels may be routed into a predetermined bonding area 23, where a flexible printed circuit (PFC) or a flexible flat cable (FFC) may be connected with the aforementioned channels by bonding technique. FIG. 2C shows an enlarged partial diagram of FIG. 2A illustrating the predetermined bonding area 23 where the FPC may be connected with the center transmitting (TX) channels, the center receiving (RX) channels, the border receiving (BRX) channels and the ground (GND) channels. Generally speaking, the ground (GND) channels may be disposed between a groups of TX channels and a group of RX channels. The ground (GND) channels may also be disposed at two ends of the bonding area 23.

As exemplified in FIG. 2A/2C, the center transmitting (TX) channels, the center receiving (RX) channels, the border receiving (BRX) channels and the ground (GND) channels total 24 channels (i.e., 6+6+6+6). Generally speaking, a total amount of the channels is X+Y+Z+M, where X represents an amount of the center transmitting (TX) channels, Y represents an amount of the center receiving (RX) channels, Z represents an amount of the border receiving (BRX) channels, and M represents the ground (GND) channels.

It is particularly noted that, the bonding area 23 increases according to an amount of the border receiving (BRX) channels when more features or functions are added at a side surface of the wearable electronic device. As the area of a wearable electronic device is limited in nature, the increasing bonding area 23 is in contradiction with the increasing features/functions allowable. For overcoming the disadvantages of the wearable electronic device exemplified in FIG. 2A/2C, an embodiment of the invention is proposed below.

Figure 3A:
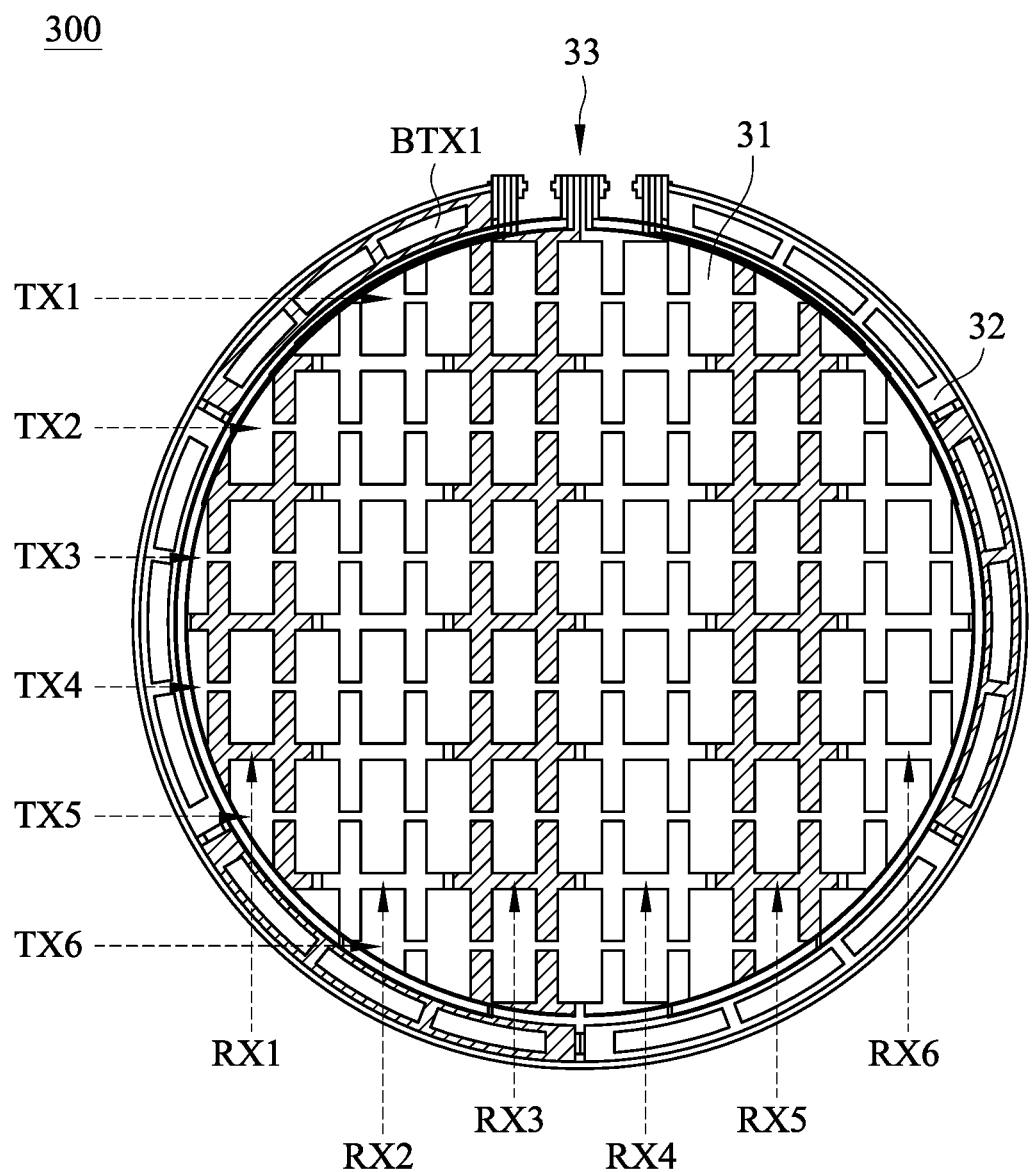
FIG. 3A shows a top view illustrated of a reflected-capacitive touch panel of a wearable electronic device according to one embodiment of the present invention.

FIG. 3A shows a top view illustrated of a reflected-capacitive touch panel 300 of a wearable electronic device (such as the smartwatch 100 exemplified in FIG. 1) according to one embodiment of the present invention. A round shape of the reflected-capacitive touch panel ("touch panel" hereinafter) 300 is exemplified here. The touch panel 300 of the present embodiment may include a center touch sensing portion, and a border touch sensing portion surrounding the center touch sensing portion. Similar to the touch panel 200 of FIG. 2A, the center touch sensing portion of the present embodiment is constructed from mutual-capacitance sensors 31 that are arranged in a specific form such as a matrix form. The mutual-capacitance sensors 31 may be operated by sending driving signals via center transmitting (TX) channels (e.g., TX1 to TX6, totaling six center transmitting channels) and receiving sensing signals via center receiving (RX) channels (e.g., RX1 to RX6, totaling six center receiving channels) to detect mutual-capacitance of the center touch sensing portion. Generally speaking, the center TX channels are arranged in a first direction, and the center RX channels are arranged in a second direction that is, for example, substantially perpendicular to the first direction. For example, the center TX channels are arranged in rows and the center RX channels are arranged in columns.

Contrary to the touch panel 200 of FIG. 2A, the border touch sensing portion of the present embodiment is constructed from hybrid self-capacitance and mutual-capacitance sensors 32 (six sensors 32 are shown) that are arranged surrounding the center touch sensing portion. The hybrid self-capacitance and mutual-capacitance sensors ("hybrid sensors" hereinafter) 32 may be operated by sending driving signals via at least one border transmitting (BTX) channel (e.g., BTX1) and receiving sensing signals via the center receiving (RX) channels to detect mutual-capacitance of the border touch sensing portion. At the same time, the hybrid sensors 32 may also be operated by receiving sensing signals via the center receiving (RX) channels to detect self-capacitance and mutual-capacitance of the border touch sensing portion. In the embodiment, the border touch sensing portion includes a single border transmitting (BTX) channel.

It is noted that the border transmitting (BTX) channel (of the border touch sensing portion) is independent from the center transmitting (TX) channels (of the center touch sensing portion). According to one aspect of the embodiment, the center receiving (RX) channels are associated with both the center touch sensing portion and the border touch sensing portion. Alternatively speaking, the center receiving (RX) channels are shared between the center touch sensing portion and the border touch sensing portion. Similar to the touch panel 200 of FIG. 2A, the touch panel 300 of the present embodiment may also include ground (GND) channels (e.g., TXGND for center/border transmitting channels and RXGND for center receiving channels, totaling six ground channels).

Figure 3B:
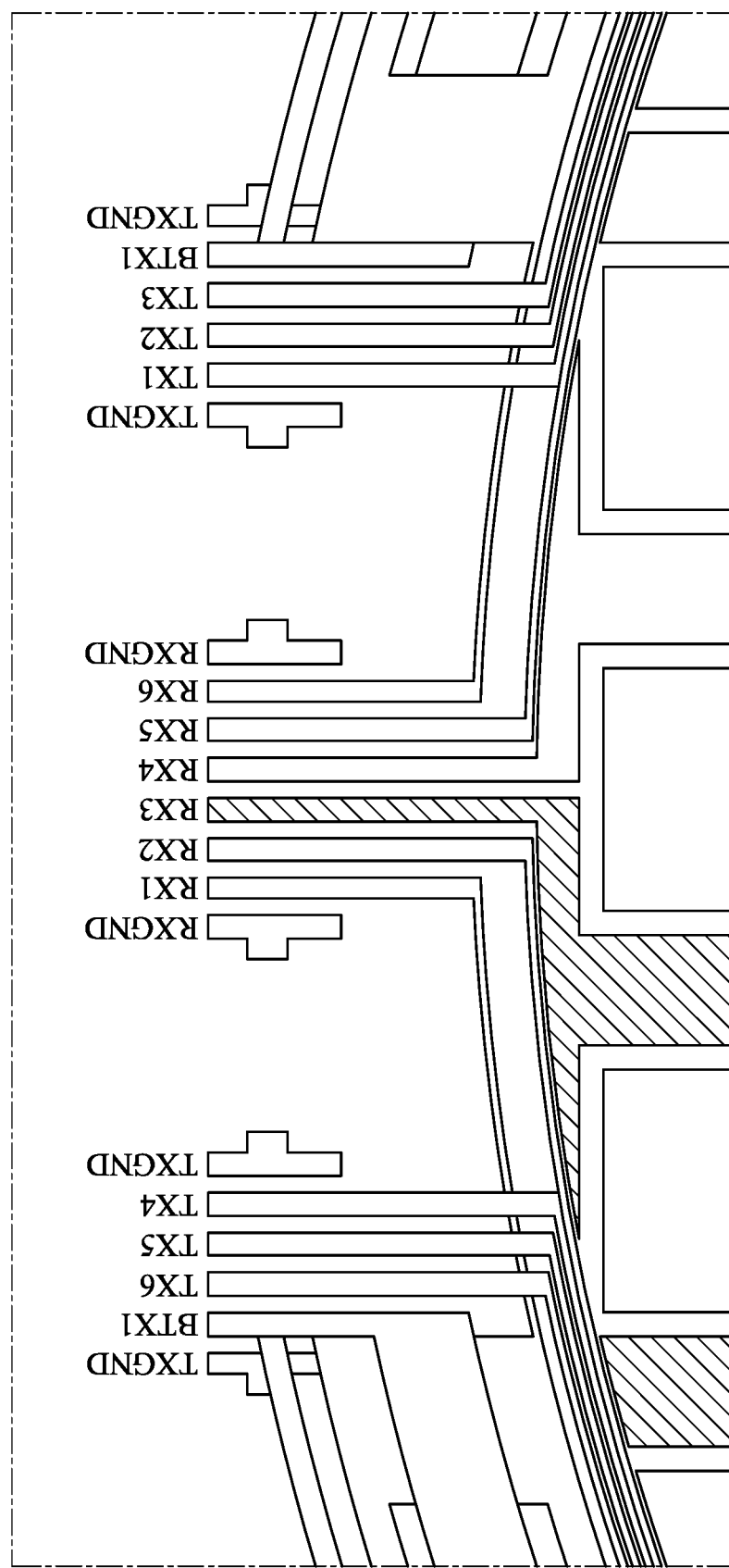
FIG. 3B shows an enlarged partial diagram of FIG. 3A illustrating the predetermined bonding area.

The center transmitting (TX) channels, the center receiving (RX) channels, the border transmitting (BTX) channel and the ground (GND) channels may be routed into a predetermined bonding area 33, where a flexible printed circuit (PFC) or a flexible flat cable (FFC) may be connected with the aforementioned channels by bonding technique. FIG. 3B shows an enlarged partial diagram of FIG. 3A illustrating the predetermined bonding area 33 where the FPC may be connected with the center transmitting (TX) channels, the center receiving (RX) channels, the border transmitting (BTX) channel and the ground (GND) channels.

As exemplified in FIG. 3A/3B, the center transmitting (TX) channels, the center receiving (RX) channels, the border transmitting (BTX) channel and the ground (GND) channels total 19 channels (i.e., 6+6+1+6). Generally speaking, a total amount of the channels is X+Y+1+M, where X represents an amount of the center transmitting (TX) channels, Y represents an amount of the center receiving (RX) channels, and M represents the ground (GND) channels.

According to the embodiment proposed in FIG. 3A/3B, it is particularly noted that, the bonding area 33 of the embodiment (FIG. 3A) is smaller than that of FIG. 2A. In another embodiment, the bonding area 33 may remain constant (i.e., X+Y+1+M) when more features or functions are added at a border of the touch panel 300 of the wearable electronic device. To the contrary, the bonding area 23 in FIG. 2A/2C increases when more features or functions are added at a border of the touch panel 200 of the wearable electronic device.

Figure 4:
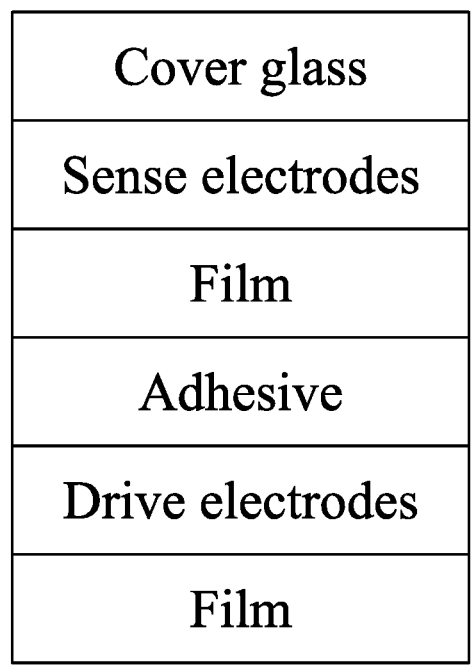
FIG. 4 shows a stack diagram illustrated of a touch sensing structure adaptable to the touch panel of FIG. 3A according to one embodiment of the present invention.

The embodiment illustrated in FIG. 3A may be implemented by a variety of touch sensing structures. FIG. 4 shows a stack diagram illustrated of a touch sensing structure adaptable to the touch panel 300 of FIG. 3A/3B according to one embodiment of the present invention. Specifically, the touch sensing structure is a double-sided indium tin oxide (DITO) with a bare glass and two single-sided ITO films (i.e., GFF). It is appreciated that other touch sensing structures may be adapted to the touch panel 300 of FIG. 3A.

Although specific embodiments have been illustrated and described, it will be appreciated by those skilled in the art that various modifications may be made without departing from the scope of the present invention, which is intended to be limited solely by the appended claims.

What is claimed is:

1. A reflected-capacitive touch panel of a wearable electronic device, comprising:
   a center touch sensing portion composed of a plurality of mutual-capacitance sensors;
   a border touch sensing portion surrounding the center touch sensing portion, the border touch sensing portion being composed of a plurality of hybrid self-capacitance and mutual-capacitance sensors; and
   a predetermined bonding area into which channels of the center touch sensing portion and the border touch sensing portion are routed;
   wherein the center touch sensing portion comprises:
   a plurality of center transmitting channel arranged in a first direction; and
   a plurality of center receiving channels arranged in a second direction that is distinct from the first direction;
   wherein driving signals are sent via the center transmitting channels and sensing signals are then received via the center receiving channels to detect mutual-capacitance of the center touch sensing portion;
   wherein the border touch sensing portion comprises:
   at least one border transmitting channel;
   wherein the center receiving channels are shared between the center touch sensing portion and the border touch sensing portion, driving signals are sent via the border transmitting channel and sensing signals are received via the center receiving channels to detect mutual-capacitance of the border touch sensing portion, and sensing signals are received via the center receiving channels to detect self-capacitance and mutual-capacitance of the border touch sensing portion.

2. The touch panel of claim 1, wherein the second direction is substantially perpendicular to the first direction.

3. The touch panel of claim 1, wherein the at least one border transmitting channel comprises a single border transmitting channel.

4. The touch panel of claim 1, wherein the border transmitting channel is independent from the center transmitting channels.

5. The touch panel of claim 1, further comprising a plurality of ground channels.

6. The touch panel of claim 5, wherein the center transmitting channels, the center receiving channels, the at least one border transmitting channel and the ground channels are routed into the predetermined bonding area.

7. The touch panel of claim 1, further comprising a flexible printed circuit connected with the predetermined bonding area.

8. The touch panel of claim 1, wherein the wearable electronic device comprises a smartwatch.

9. A wearable electronic device, comprising:
   a housing;
   a reflected-capacitive touch panel disposed on a front surface of the housing, the touch panel comprising:
   a center touch sensing portion composed of a plurality of mutual-capacitance sensors;
   a border touch sensing portion surrounding the center touch sensing portion, the border touch sensing portion being composed of a plurality of hybrid self-capacitance and mutual-capacitance sensors; and
   a predetermined bonding area into which channels of the center touch sensing portion and the border touch sensing portion are routed;
   wherein the center touch sensing portion comprises:
   a plurality of center transmitting channel arranged in a first direction; and
   a plurality of center receiving channels arranged in a second direction that is distinct from the first direction;
   wherein driving signals are sent via the center transmitting channels and sensing signals are then received via the center receiving channels to detect mutual-capacitance of the center touch sensing portion;
   wherein the border touch sensing portion comprises:
   at least one border transmitting channel;
   wherein the center receiving channels are shared between the center touch sensing portion and the border touch sensing portion, driving signals are sent via the border transmitting channel and sensing signals are received via the center receiving channels to detect mutual-capacitance of the border touch sensing portion, and sensing signals are received via the center receiving channels to detect self-capacitance and mutual-capacitance of the border touch sensing portion.

10. The wearable electronic device of claim 9, wherein the second direction is substantially perpendicular to the first direction.

11. The wearable electronic device of claim 9, wherein the at least one border transmitting channel comprises a single border transmitting channel.

12. The wearable electronic device of claim 9, wherein the border transmitting channel is independent from the center transmitting channels.

13. The wearable electronic device of claim 9, wherein the touch panel further comprises a plurality of ground channels.

14. The wearable electronic device of claim 13, wherein the center transmitting channels, the center receiving channels, the at least one border transmitting channel and the ground channels are routed into the predetermined bonding area.

15. The wearable electronic device of claim 9, further comprising a flexible printed circuit connected with the predetermined bonding area.

16. The wearable electronic device of claim 9, wherein the wearable electronic device comprises a smartwatch.

* * * * *